(12) United States Patent
Gassmann et al.

(10) Patent No.: US 11,015,708 B2
(45) Date of Patent: May 25, 2021

(54) AXLE DRIVE UNIT WITH A POWER-SHIFTABLE 2-WAY TRANSMISSION

(71) Applicant: GKN Automotive Ltd., Birmingham (GB)

(72) Inventors: Theodor Gassmann, Siegburg (DE); Dirk Güth, Detmold (DE); Jan Haupt, Kürten (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/642,415

(22) PCT Filed: Sep. 5, 2017

(86) PCT No.: PCT/EP2017/072272
§ 371 (c)(1),
(2) Date: Feb. 27, 2020

(87) PCT Pub. No.: WO2019/048031
PCT Pub. Date: Mar. 14, 2019

(65) Prior Publication Data
US 2020/0256465 A1    Aug. 13, 2020

(51) Int. Cl.
*F16H 63/50* (2006.01)
*F16H 3/66* (2006.01)
*F16H 63/30* (2006.01)

(52) U.S. Cl.
CPC .......... *F16H 63/502* (2013.01); *F16H 3/663* (2013.01); *F16H 63/3026* (2013.01);
(Continued)

(58) Field of Classification Search
None
See application file for complete search history.

(56) References Cited

U.S. PATENT DOCUMENTS 4,688,450 A * 8/1987 Hayashi ................ B60W 10/06
                                                      477/109
4,819,187 A * 4/1989 Yasue .................... B60W 10/11
                                                       701/99
(Continued)

FOREIGN PATENT DOCUMENTS

DE         4311921 A1   10/1994
DE    102012216132 A1    3/2014
(Continued)

OTHER PUBLICATIONS

International Search Report and Written Opinion for PCT/EP2017/072272 dated May 4, 2018 (14 pages; with English translation).
(Continued)

*Primary Examiner* — Colby M Hansen
(74) *Attorney, Agent, or Firm* — Bejin Bieneman PLC

(57) ABSTRACT

In the case of an axle drive unit with a power-shiftable two-speed transmission unit, in order to enable particularly simple and advantageous control of a gear change and to manage with a small number of components and a less complex control logic and control sensor system, the coordination of mechanically-passively implemented shifting thresholds of a friction clutch and a blocking device of a freewheel is provided, which makes it possible to control the friction clutch and the blocking device with the same control variable at always the same level.

16 Claims, 4 Drawing Sheets

(52) U.S. Cl.
CPC ............... *F16H 2200/0021* (2013.01); *F16H 2200/0034* (2013.01); *F16H 2200/2005* (2013.01); *F16H 2200/2035* (2013.01); *F16H 2200/2064* (2013.01); *F16H 2200/2082* (2013.01)

(56) References Cited

U.S. PATENT DOCUMENTS 5,272,632 A * 12/1993 Noguchi ............... B60W 10/06
477/109
2003/0089569 A1    5/2003 Antonov et al.

FOREIGN PATENT DOCUMENTS

| DE | 102015104203 A1 | 9/2016 |
| DE | 102015116537 A1 | 3/2017 |
| JP | 2004514104 A | 5/2004 |
| WO | 2018099542 A1 | 6/2018 |

OTHER PUBLICATIONS

JPO Office Action for Japanese Patent Application No. 2020-513629 dated Mar. 30, 2021 (9 pages; with English translation).

* cited by examiner

AXLE DRIVE UNIT WITH A POWER-SHIFTABLE 2-WAY TRANSMISSION

CROSS-REFERENCE TO RELATED APPLICATIONS

This application is a national stage of, and claims priority to, Patent Cooperation Treaty Application No. PCT/EP2017/072272, filed on Sep. 5, 2017, which application is hereby incorporated herein by reference in its entirety.

BACKGROUND

The disclosure relates to a two-speed transmission unit as claimed in the generic term of claim 1 and a method for controlling a shifting process in such a two-speed transmission unit as claimed in the generic term of claim 12. The disclosure further relates to an axle drive unit with such a two-speed transmission unit.

An axle drive with such a two-speed transmission unit is also disclosed in the document DE 10 2015 104 203 A1. In the two-speed transmission unit, which is designed as a planetary gearbox, a sun gear is blocked by a brake or a freewheel to implement the first gear. To implement a second gear, assembly units of the gearbox are blocked by means of a clutch, so that these rotate as a block in the second gear with the implementation of a direct drive and as a result of the release of the sun gear by the rotational direction change of the sun gear due to the freewheel. Furthermore, this document reveals the possibility of providing an additional claw clutch for fixing the sun gear in the first gear in order to enable recuperation operation even in the first gear. It is also disclosed that the power switching capability is carried out with the help of actuators. The document does not contain any indications as to how the actual shifting process takes place.

Against this background, it is the object of the disclosure to produce a transmission unit of the type mentioned above that is designed in such a way that it allows particularly simple and advantageous control of a gear shift. The shifting system to be used for this purpose should, if possible, manage with a small number of components and require as little control logic and as few control sensors as possible.

SUMMARY

To achieve this object, it is provided that the shifting system provides a clutch shifting threshold, at which the friction clutch begins to transition from the open position to the closed position or the transition from the closed position to the open position is completed, and the shifting system provides a blocking shifting threshold, at which the blocking device, in the case of a gear change, changes from the blocking position to the release position or from the release position to the blocking position, wherein the blocking shifting threshold is coordinated with the clutch shifting threshold in such a way that in the event of a shifting process
- the blocking device is moved to the release position before the transmission element interacting with the blocking device begins to turn in the freewheeling direction, and/or
- the blocking device does not change to the blocking position before the transmission element interacting with the blocking device begins to push in the blocking direction.

With regard to the method for operating such a two-speed transmission unit or an axle drive unit equipped with such a transmission unit, it is provided that both the blocking actuation and the clutch actuation are controlled independently of the operating state with the same control variables at the same level.

For a clearer separation of the shifting thresholds, it may be provided that the blocking shifting threshold and a clutch shifting threshold are coordinated in such a way that the blocking device changes to the release position before the clutch begins to transfer torque when transitioning into the closed position, i.e. before the kiss point of the clutch is reached. It may also be provided alternatively or additionally that the blocking shifting threshold and a clutch shifting threshold are coordinated so that the blocking device does not change to the blocking position before the clutch has reached the open position.

In order to further increase the shifting reliability of the shifting system, it may be provided that the blocking shifting threshold at which the blocking device switches and the clutch shifting threshold at which the switching clutch switches are coordinated in such a way that the transition of the blocking device to the release position is completed before the clutch begins to move from the open position to the closed position.

The shifting system is for example designed in such a way that it is fail-safe in the first gear. This means that the transmission unit is in the first gear when the system is unpressurized and can thus also be operated in the first gear when the blocking device is in the blocking position if the control variable feed fails. For this purpose, the system has a "normally-blocked" blocking device (a blocking device in the blocking position when the shifting system is unpressurized) and a "normally-open" friction clutch (a friction clutch that is in the open position when the shifting system is unpressurized).

The shifting system can of course also be fail-safe for the second gear, i.e. by means of a "normally-free" blocking device (a blocking device in the release position when the shifting system is unpressurized) and a "normally-closed" friction clutch (a friction clutch in the closed position when the shifting system is unpressurized).

The clutch shifting threshold is indicated by the level of the control variable acting on the clutch actuation, for example the hydraulic pressure, from which the clutch begins to close from the open position or from which the clutch is fully open from the closed position. A suitable value for this purpose if the control variable is hydraulic pressure is about 2 bar to 3 bar, for example between 2.3 bar and 2.7 bar.

The blocking shifting threshold, which is indicated by the level of the control variable acting on the blocking device and that is also for example hydraulic pressure, is the shifting threshold at which the blocking device begins to change from the blocking position to the release position or from the release position to the blocking position. The blocking shifting threshold is below the clutch shifting threshold, for example at about 1.5 bar or about 0.5 bar to 1 bar below the clutch shifting threshold, if the control variable is hydraulic pressure and especially if the shifting system is designed to be fail-safe in the first gear. In a shifting system that is designed to be fail-safe in the second gear, the blocking shifting threshold is for example 0.5 bar to 1 bar above the clutch shifting threshold.

The shifting threshold difference between the blocking shifting threshold and the clutch shifting threshold is provided as shifting reliability and causes that with increasing control variable the blocking device has safely reached the release position system-inherently before the clutch shifting threshold is reached, and/or the blocking position is only adopted system-inherently when the clutch shifting threshold has already been exceeded. If the gear change is in a different direction, it is ensured that the clutch is fully open before the blocking device begins to exit the release position.

From the above description it follows that the respective shifting thresholds can also be subject to a certain variance within one and the same shifting system and within a build series due to fluctuations in properties, friction behavior or due to tolerance fluctuations in individual components and may also be different as a result of hysteresis, depending on whether the shifting threshold is passed through during a control variable increase or a control variable reduction. It is therefore possible that a shifting threshold cannot be assigned a very specific, unambiguous control variable value (hydraulic pressure) but only a value extending over a small variance range.

The design of the shifting system described above allows control of both the blocking actuation and the clutch actuation with the same control variable at the same level regardless of the operating state. This means that only one control variable unit, such as a torque-controlled and/or revolution rate-controlled hydraulic pump supplying hydraulic pressure and for example controlled electronically via the pump current or the revolution rate or only a hydraulic control valve, must be arranged upstream of the clutch actuation and the blocking actuation. The same identical control variable, in particular the same identical hydraulic line pressure commonly controlled by a single hydraulic pump or by a single hydraulic control valve, may act always at the same level both on the clutch actuation and on the blocking actuation. Blocking actuation and clutch actuation can be controlled via the same hydraulic line.

This in turn enables the formation of both the clutch actuation and the blocking actuation as mechanical-passive actuation systems. "Mechanical-passive" means an actuation that guarantees the desired shift sequence purely due to the mechanical properties thereof, without the need for external (electronic) control interventions or a sensor system. For this purpose, the blocking actuation and the clutch actuation—both for example include actuators operated via hydraulic pressure—have pre-tensioning elements that ensure the desired shift process or shift sequence. The pre-tensioning element of the blocking actuation is therefore dimensioned in such a way that it represents the desired blocking shifting threshold mechanically-passively when the control variable is increasing, and the pre-tensioning element of the clutch actuation is therefore dimensioned in such a way that it represents the desired clutch shifting threshold mechanically-passively when the control variable is increasing. At the same time, the pre-tensioning elements act as resetting elements, which, when the control variable is decreasing and falls below the respective shifting threshold, push the blocking device back into the fail-safe position, i.e. the position that the shifting system adopts in the pressureless state as intended.

In a shifting system that is fail-safe in the second gear, the resetting elements push the blocking device into the release position and the friction clutch into the closed position when the control variable decreases (with decreasing shifting system pressure). In a shifting system that is fail-safe in the first gear, the resetting elements push the blocking device into the blocking position and the friction clutch into the open position when the control variable is decreasing (with decreasing shifting system pressure).

The blocking device is for example a shape-locking blocking device, by means of which the transmission element interacting with the blocking device is supported against a rotationally rigid component of the transmission unit or the axle drive unit with the formation of a torque-supporting form-fit, in particular against a transmission housing or an axle drive housing or a component rotationally fixedly attached thereto. The blocking device may be integrated into the locking device and the blocking device and the locking device may have a common housing, which in an advantageous embodiment can be attached to the outside of the housing of the transmission unit or the axle drive unit. The locking device may be designed in particular as an automatically switching, mechanical-passive freewheel.

As a result, the blocking device ensures that it blocks the locking device or the freewheel in the first gear in both rotation directions, that the torque is effectively supported in the first gear in operating states that are accompanied by a torque reversal in the gearbox (recuperation operation or reversing) when compared to the normal straight-ahead travel. This ensures that the vehicle can also recuperate and reverse in the first gear.

It should be noted that an interaction of one or more transmission elements with the blocking device or the rotationally fixed holding or blocking of one or more transmission elements by means of the friction clutch only means an interaction or rotationally fixed holding or blocking in functional terms and does not necessarily mean that the blocking device and the interacting transmission element are directly engaged with each other or that the friction clutch and the transmission element that is held or blocked thereby are in direct contact. The functional interaction can also be carried out indirectly via interposed intermediate elements.

The transmission element that functionally interacts with the blocking device, and/or the transmission element functionally interacting with the locking device is/are each for example a sun gear of a sun unit, in particular a supporting sun wheel of a double sun unit, which has a supporting sun wheel unit with a supporting sun wheel and an output sun unit with an output sun wheel. The transmission elements that are blocked by the friction clutch are for example an outer wheel unit and a drive sun wheel belonging to a double sun unit or a supporting sun wheel belonging to a double sun unit. Of course, this functional arrangement of friction clutch and blocking device can be deviated from if this is offered in a particular application, for example for the realization of other transmission ratios or other load paths or when using a classic planetary gear with an internally toothed hollow wheel. Thus, in particular, the friction clutch may also be arranged in such a way that it blocks the planetary unit and the outer wheel unit or the sun unit and the planetary unit.

The planetary unit can be formed in particular as a double planetary unit with a number of planet wheel pairs with different effective diameters. The planet wheels are mounted on circulating web shafts, which are firmly connected to a drive wheel unit, which meshes with the shaft driven by the electric motor (the transmission drive shaft) or are at least rotationally fixedly mounted relative thereto. Together with the web shaft, said drive wheel unit, which is for example in the form of the outer wheel unit, thus forms the input element of the transmission driven by the electric motor. In the preferred embodiment as the outer wheel unit, the drive wheel unit can at least partially accommodate the planet wheels radially internally, but is—unlike an internally toothed hollow wheel of a classic planetary transmission, which meshes with the planet wheels with its internal teeth—for example in the form of a non-internally toothed but only externally toothed drive wheel, which meshes on the outside with the shaft driven by the electric motor (the transmission drive shaft).

The two-speed transmission unit with a power-shiftable two-speed transmission for the transmission of electric motor propulsion power within a motor vehicle drive train of a passenger car driven by an electric motor or a hybrid drive is provided as part of an axle drive unit, which is used to distribute electric motor drive power to two wheels of an electric motor-driven or hybrid-driven axle of a motor vehicle. The two-speed transmission unit or axle drive unit for example has a differential unit for balancing differential revolution rates of a right drive wheel and a left drive wheel of the axle driven by the axle drive unit. Such a two-speed transmission unit has two transmission ratios, one of which is for example realized as a direct drive (i=1, for example the second gear) and a transmission ratio with a transmission ratio different from the direct drive transmission ratio (i #1, for example i>1 and further for example 1.7<i<2, each for example in the first gear). The two-speed transmission unit therefore further for example has the three transmission assembly units drive wheel unit (for example in the form of an external wheel unit), planetary unit or double planetary unit and sun unit or double sun unit, which can each have one or more transmission elements. Advantageously, the axle drive unit may have an axle drive housing in which both the two-speed transmission unit and the differential unit as well as for example also an electric drive machine (electric motor) are integrated together. In this case, the electric drive machine can be arranged coaxially with respect to the rotation axis of the half-shafts driving the drive wheels.

The axle drive unit outlined in the preceding paragraph and a two-speed transmission suitable for such an axle drive unit are disclosed in the documents of the international patent application PCT/EP2016/079169, which is hereby made the subject-matter of this application in its complete form.

DETAILED DESCRIPTION

Figure 1:
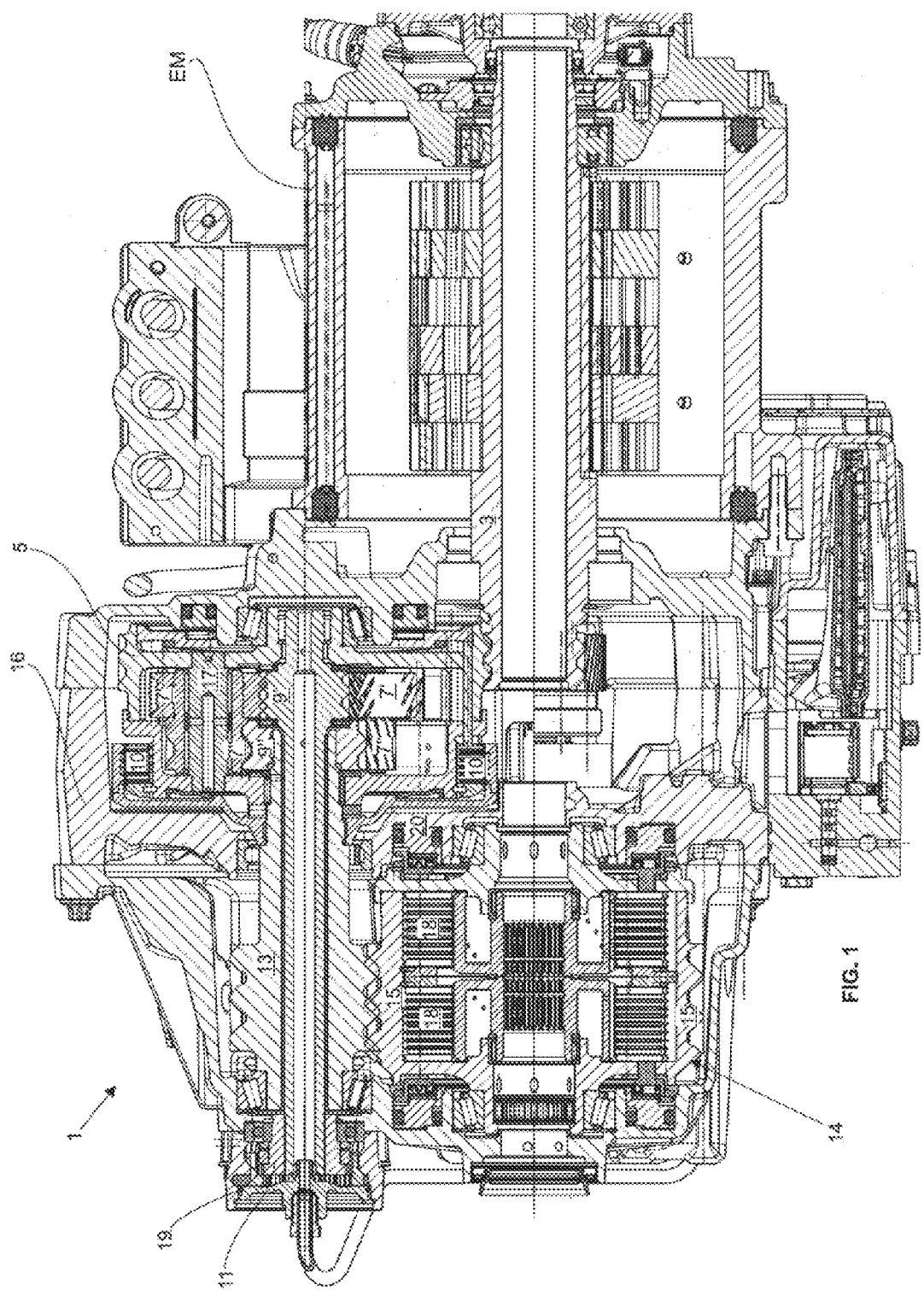
FIG. 1 shows an axle drive unit with a two-speed transmission unit integrated into a common axle drive housing and a clutch-controlled differential unit without a differential.
Figure 2:
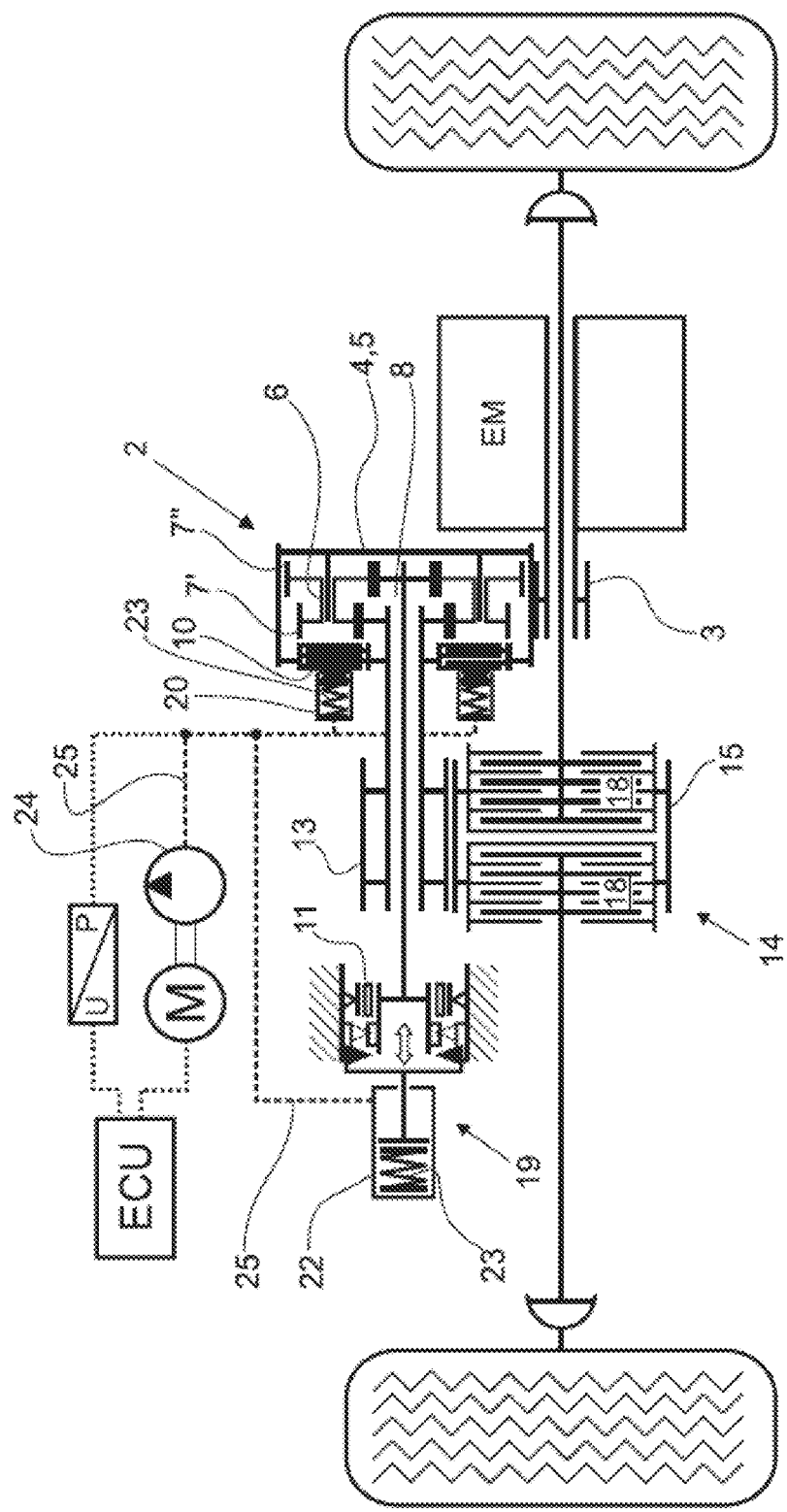
FIG. 2 shows a schematic view of the axle drive unit shown in FIG. 1.

FIG. 1 and FIG. 2 each show an axle drive unit 1 with an integrated two-speed transmission 2. The axle drive unit is designed for use in an electric motor drive train and/or a combustion engine (hybrid) drive train of a motor vehicle.

A transmission drive shaft 3 driven by an electric motor EM is directly engaged with an outer wheel unit 4 of a two-speed transmission 2 via outer toothing, in order to introduce the electromotive drive power via the outer wheel unit 4 into the two-speed transmission 2. The outer wheel unit 4 has an outer wheel 5 for this purpose, on whose outer surface the outer wheel toothing that is engaged with the driven transmission drive shaft 3 is directly formed.

In the exemplary embodiment shown in FIG. 1, the outer wheel unit 4 is rotationally fixedly connected to the planetary unit 6, so that twisting of the planetary unit 6 and the outer wheel unit 4 relative to each other is excluded regardless of the shifting position of the clutch 10. The outer wheel unit 4 and the planetary unit 6 thus together form a functional unit, which acts as the input element of the two-speed transmission.

The planetary unit 6 is in the form of a double-planetary unit and has a number of planet wheel pairs, each comprising a first planet wheel 7' and a second planet wheel 7". The first planet wheel 7' and the second planet wheel 7" are rotationally fixedly connected to each other and have different effective diameters. The planet wheel pair can be in a one-piece or multi-piece form with first planet wheels 7' and second planet wheels 7" that are arranged rotationally fixedly relative to each other.

If the outer wheel unit 4 or the outer wheel 5 is driven rotationally by the transmission drive shaft 3, the outer wheel 5 drives the planet wheel shafts 17 with it, on which the planet wheel pairs are rotatably mounted. The first planet wheel 7' meshes with a supporting sun wheel 9', the second planet wheel 7" meshes with an output sun wheel 9". The first planet wheel and the second planet wheel as well as the supporting sun wheel 9' and the output sun wheel 9" each have different effective diameters.

The axle drive unit 1 has a clutch-controlled differential unit 14 with no differential gear and without a positive action differential gearbox, but with two individually controllable differential clutches 18, by means of which the electromotive drive power is forwarded to the drive wheels. Of course, a classic differential transmission can be used instead of such a differential unit. As can be seen from FIG. 1 and FIG. 2, the transmission drive shaft 3 is designed as a hollow shaft and its rotation axis coincides with the rotation axis of the wheel shafts as well as that of the electric motor EM.

Radially integrated into the outer wheel 5 is a double planetary unit 6 with a number of planet wheel pairs, each including a first planet wheel 7' and a second planet wheel 7", which in turn mesh with a sun transmission unit 8 that is also axially integrated into the planetary unit 6 and that has a supporting sun wheel 9' and a drive sun wheel 9".

A hydraulically actuatable clutch 10 with which the output sun wheel 9" and the outer wheel unit 4 can be blocked relative to each other by closing the clutch 10 is arranged laterally next to the planetary unit 6, so that the two-speed transmission 2 including the outer wheel unit 4, the planetary unit 6 and the sun unit 8 rotates as a block to implement a direct drive (i=1, for example 2nd gear). Here, the supporting sun wheel 9' also rotates relative to the axle drive housing 16 in a freewheeling direction, which enables a freewheel 11, which in the exemplary embodiment shown is rotationally fixedly arranged on the outer side of the axle drive housing 16, if a blocking device 19 is in a release position in which the freewheel allows a rotation of the supporting sun wheel 9' in the freewheel direction. In order to allow the interaction of the supporting sun wheel 9' and the freewheel 11, an internal shaft rotationally fixedly connected to the supporting sun wheel 9' is led outwards within the transmission output shaft 13 in the form of a hollow shaft in order to interact there with the locking device (freewheel 11) that is arranged from the outside on the axle drive housing 16 and that is thus easily accessible from the outside.

For the implementation of the desired transmission ratio i>1 (for example 1st gear) the effective diameter of the first planet wheel 7' is larger than the effective diameter of the second planet wheel 7" and correspondingly the effective diameter of the supporting sun wheel 9' is smaller than the effective diameter of the output sun wheel 9".

If the clutch 10 is opened, the supporting sun wheel 9', which is now acted on in the blocking direction as a result of a rotational direction reversal is supported via the freewheel 11 against the axle drive housing 16. The first planet wheel 7' rolls on the stationary supporting sun wheel 9' while it is rotating around the planet wheel shaft 17 and thereby directly drives the second planet wheel 7", which in turn drives the output sun wheel 9" acting between the second planet wheel 7" and the output sun wheel 9", and thus drives the rotationally fixedly connected transmission output shaft 13. The output sun wheel 9" and the transmission output shaft 13, provided they are formed in one piece as shown in FIG. 1, can together form the transmission output element. Of course, the transmission output shaft 13 and the output sun wheel 9" can also be multi-part, in that the output sun wheel 9", as a separate component from the transmission output shaft 13, is rotationally fixedly connected to the transmission output shaft 13.

It should be noted that the first planet wheel 7' meshing with the supporting sun wheel 9' can—as shown in FIG. 1—basically be arranged both on the side of the planet wheel pair facing away from the clutch 10 or the right side in FIG. 1 as well as on the side of the planet wheel pair facing towards the clutch 10 or on the left side in FIG. 1. Contrary to the embodiment shown in FIG. 1 and FIG. 2, the transmission output shaft 13 is then to be in the form of an inner shaft, while the shaft interacting with a locking device (freewheel 11) and rotationally fixedly connected to the supporting sun wheel 9' is to be in the form of a hollow shaft enclosing the inner shaft.

However, the version shown in FIG. 1 and FIG. 2 is preferable, because here the clutch 10 directly blocks the function unit acting as the transmission input element (outer wheel unit 4 and the planetary unit 6 forming a unit therewith) with the transmission output shaft 13, so that the other intermediate components (planet wheel pair, supporting sun wheel, bearing, etc.) are effectively bridged and thus largely removed from the drive chain and are not subjected to significant stress when operating the vehicle in direct drive.

It is also advantageous with the embodiment apparent from FIGS. 1 and 2 that the clutch lamellas of the clutch 10 can be arranged around the second planet wheel 7", which sweeps over a smaller diameter with its outer surface than the first planet wheel 7". In this way, the clutch 10, despite the fact that it radially externally surrounds at least part of the planet wheel pairs, can have a smaller diameter than with an embodiment in which the clutch 10 is arranged around the first planet wheel 7'.

It should be noted that in contrast to the embodiment shown in FIG. 1 with only an externally toothed outer wheel, a double-planetary unit and a double sun unit, of course a design is also conceivable in which a classic planetary transmission is used that can also use an internally toothed hollow wheel as an outer wheel unit, a simple planetary unit (a planetary unit without planet wheel pairs that have two planet wheels of different effective diameter) and a simple sun unit (a sun unit with only a single sun wheel), as described inter alia in the documents of the international patent application PCT/EP2016/079169.

It can be seen from FIG. 2 that both the clutch actuation 20 and the blocking actuation 22 of the blocking device are controlled via the same hydraulic line with hydraulic pressure at always the same level. The blocking actuation 22 and the clutch actuation 20 both have pre-tensioning means 23 formed by springs, which also act as a resetting means at the same time. Due to the dimensioning of the pre-tensioning means 23 it is ensured that in the shifting system shown in FIG. 2, the blocking device 19 has already moved into the blocking position at a pressure shifting threshold before the friction clutch 10 begins to close and remains there securely as long as the shifting system pressure is above the clutch shifting threshold. Due to this coordination of the blocking shifting threshold and the clutch shifting threshold with purely mechanical measures, the desired switching sequence is mechanically inherent in the system for the shifting system shown in FIG. 2, which is a fail-safe system in the first gear. This design not only allows simple control, but also that blocking actuation and clutch actuation can both be controlled hydraulically via only one pump or only one valve and that both actuations automatically return to the fail-safe position in the desired switching sequence when the respective shifting threshold is exceeded. Neither when shifting up nor when shifting down is an elaborately controlled "hand-over" necessary, such as is required by dual-clutch transmissions for example.

Figure 3:
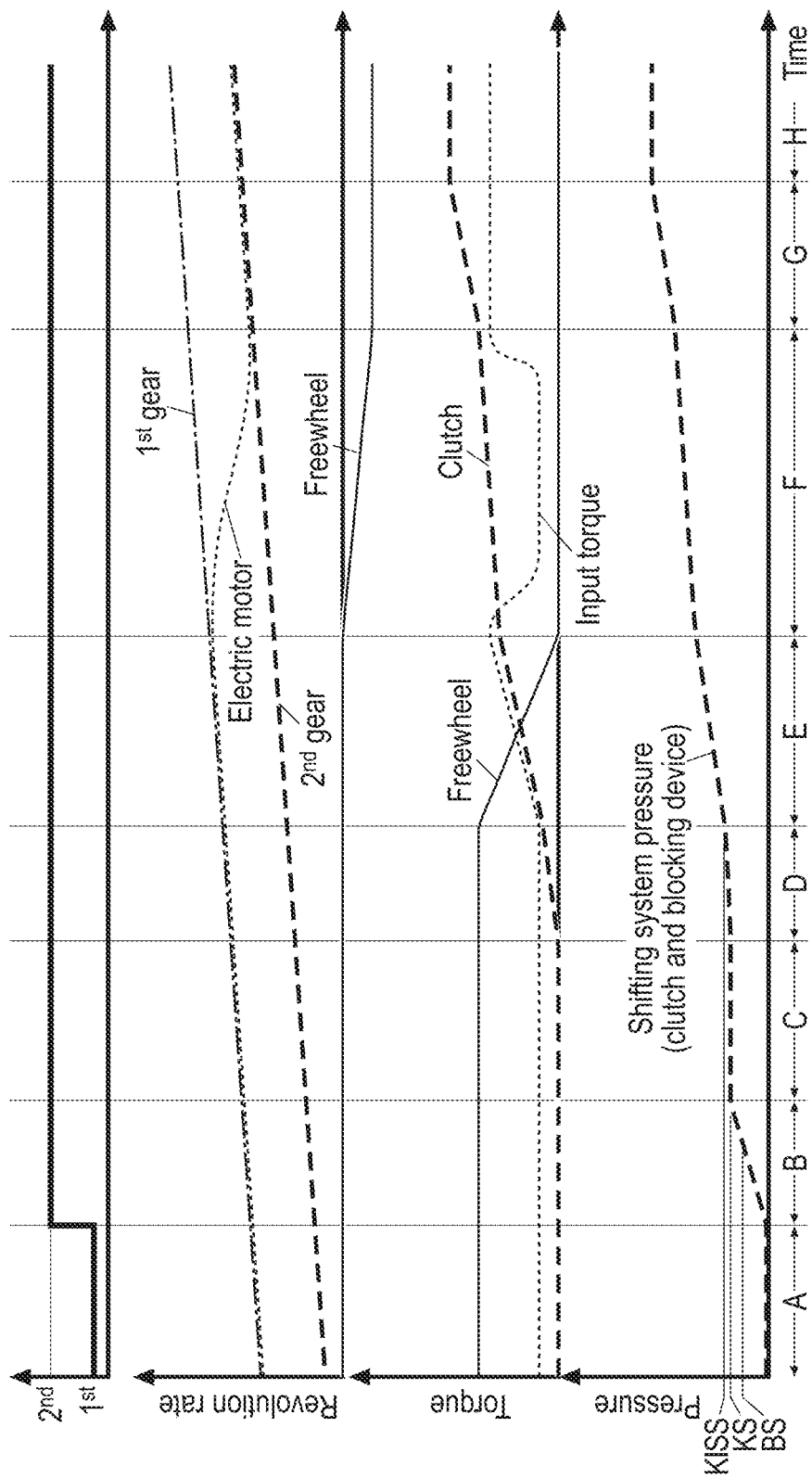
FIG. 3 shows a diagram of a shift sequence in the event of a gear change (shifting up from the first gear to the second gear under load)
Figure 4:
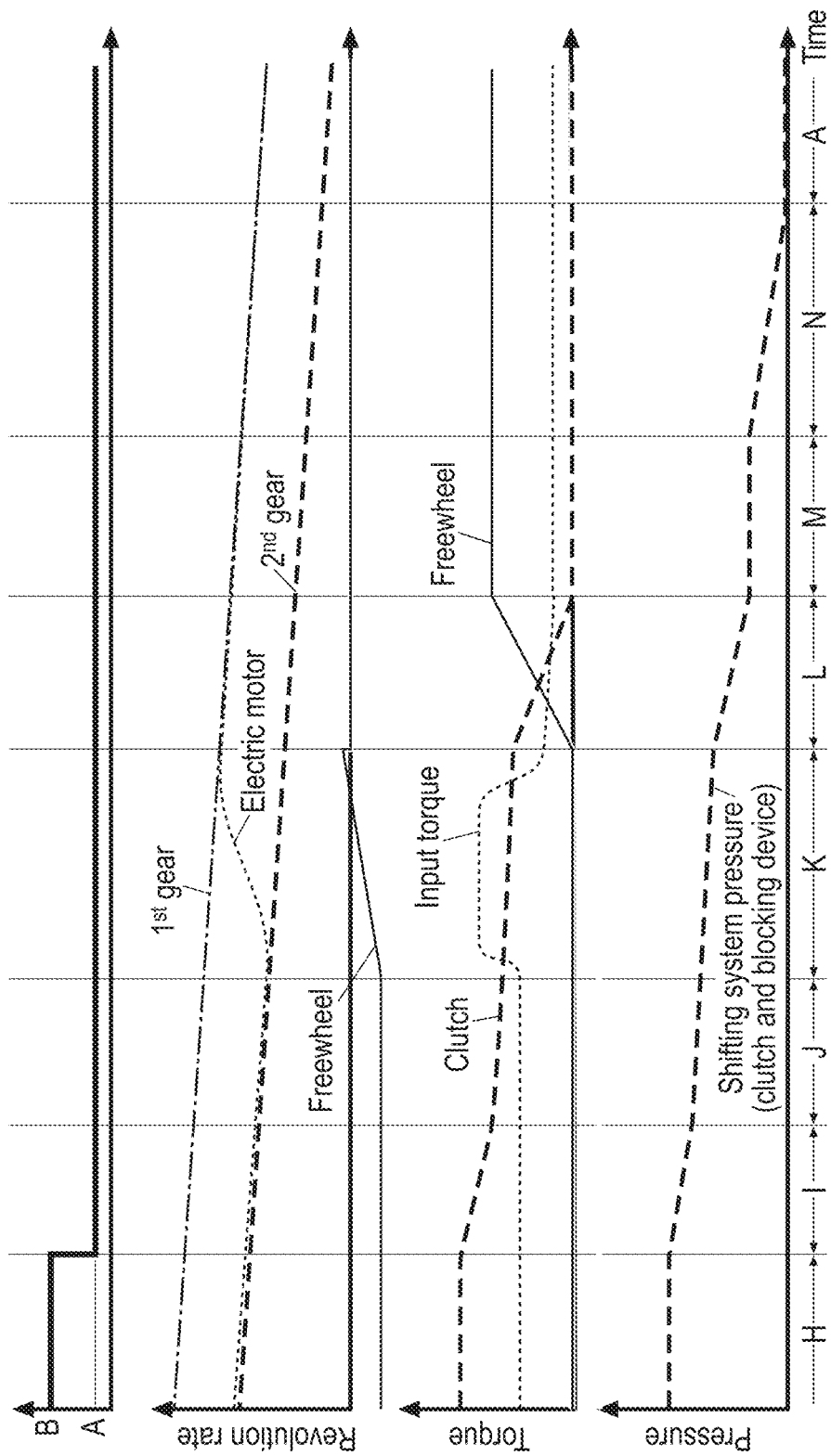
FIG. 4 shows a diagram of a shift sequence in the event of a gear change (shifting down from the second gear to the first gear).

FIG. 3 and FIG. 4 show the sequential events of a shifting process in 7 individual sections A to H (shifting up) or sections H to N (shifting down) using curves displaying revolution rates, torque and hydraulic pressure in the shifting system. Here FIG. 3 represents the processes when shifting up from the first to the second gear and FIG. 4 represents the processes when shifting down from the second to the first gear in a sequential sequence above the time axis. The widths of each section A to G are not time-proportional. The curves are used as a figurative illustration of the shifting processes and are not to be interpreted quantitatively and absolutely, but are only to be interpreted as qualitatively roughly approximate to the actual profile. The individual sections explained below flow smoothly into each other in reality.

The upshifting operation under load is then as follows:

In section A, the first gear is engaged. The revolution rate of the electric motor follows the revolution rate specified by the first gear at the present vehicle speed and vehicle acceleration (straight line "$1^{st}$ gear"). The increasing revolution rate of the electric motor indicates that the vehicle is accelerating. The hydraulic system pressure is zero. A constant torque is applied to the freewheel, as it supports the supporting sun wheel pushing in the blocking direction. The transmission input torque introduced into the transmission and provided by the electric motor is constant. At the end of section A, a shift demand is made for changing gear from the first gear to the second gear.

Sections B and C show a pre-conditioning of the shifting system in preparation for the desired gear change. As a result of the shift demand, the hydraulic shifting system pressure increases in section B (release section) while exceeding the blocking shifting threshold. The blocking device is therefore transferred to a release position and at the end of section B the freewheel is unlocked. Section B is followed by a section C (bridging section) in which for a short period of time the shifting system pressure is kept constant above the blocking switch threshold BS and for example in the region of the clutch shifting threshold KS, so that the freewheel can now be considered safely unlocked or released. Section C can be kept very short in time or even omitted. At the end of sections B and C, the system is pre-conditioned for the shifting process.

In section D (kiss-point section), the kiss-point of the clutch is approached by exceeding the clutch shifting threshold KS. During this phase, the clutch torque increases slightly, because the clutch arrangement transfers some torque even before reaching the actual kiss point due to increasing system friction and effects between the approaching clutch lamellas before the actual kiss point is reached.

In section E (torque section), the load or torque is increasingly shifted from the freewheel to the clutch, as shown by the falling torque curve for the freewheel and the increasing torque curve for the clutch. The load on the freewheel is increasingly reduced, while at the same time the clutch is increasingly loaded due to the increasing shifting system pressure and receives an increasing proportion of the power to be transmitted. In order to allow a smooth load transfer, in particular no loss of propulsion noticeable by the driver, the input torque at the transmission input element is raised or increased by the electric motor in coordination with the clutch torque increasingly transmitted by the clutch. The power dissipation in the friction clutch resulting from the revolution rate alignment of the two sides of the clutch to be carried out in this section E is effectively compensated in this way, so that the drive power arriving at the drive wheels remains as constant as possible and the driver does not feel any interruption in traction. At the end of section E, the freewheel load is completely removed. The transmission element interacting with the freewheel, in FIGS. 1 and 2 the supporting sun wheel 9', is (just still) stationary and is (just) ready to start to rotate in the freewheel direction, which is made possible without hindrance by the previously conducted transfer of the blocking device into the release position, which must be completed now at the latest. However, the effective transmission ratio between the transmission input side and the transmission output side is still essentially that of the first gear. However, the transmission ratio is represented by the revolution rate difference prevailing between the two sides of the clutch.

The actual shifting process only follows now in section F (electric motor revolution rate adjustment), in which the revolution rate of the electric motor is adjusted to the revolution rate specified by the second gear. From the graph concerning the revolution rate it can be seen that the electric motor revolution rate only now approaches the revolution rate specified by the second gear at the present speed. In this phase, the motor revolution rate is reduced, but the motor torque is reduced, because the energies in the system as a result of the mass inertias, in particular the kinetic energies present in the electric motor, must first be reduced. The shifting system pressure continues to increase at this stage in order to further close the clutch and further increase the torque transmitted by the clutch and to reduce the differential revolution rates between the clutch input side and the clutch output side to zero. The supporting sun wheel begins to rotate the freewheel in the freewheel rotation direction, which is illustrated by the revolution rate curve of the freewheel falling into the negative.

If the electric motor has reached the revolution rate specified by the 2nd gear at the present speed during the transition from section F to section G, the torque will be raised to the level that is necessary at the specified speed to feel a uniform maintenance of the drive power and the drive power loss caused by the completed revolution rate drop is compensated. The friction clutch, which is already in the closed position at the beginning of section G (clutch closing section) and is transmitting the entire drive power without slip, is made more firmly closed by a further increase in the shifting system pressure to the maximum pressure level. Following section G, the upshift process is complete.

When shifting down (FIG. 4), a corresponding shift demand is first made at the end of section H. In section I (approaching the holding torque), the shifting system pressure is lowered until the currently required friction potential of the clutch in the current driving state is reached before slipping (slip pressure) occurs.

In section J, the shifting system pressure is further lowered at a lower speed until the transmission element interacting with the freewheel, which is rotated in the freewheel direction until the end of section J at constant (negative) revolution rate ("freewheel" curve), begins to rotate more slowly at the beginning of section K (electric motor revolution rate adjustment) because an increasing proportion of the drive power is transmitted by the first gear. The revolution rate of the electric motor is raised together with the transmission input torque in order to raise the electric motor from the revolution rate specified by the transmission ratio of the 2nd gear to the revolution rate specified by the transmission ratio of the 1st gear and at the same time to compensate the friction loss in the friction clutch so that the driver does not notice the shift as far as possible.

At the end of section K, the freewheel briefly rotates in the direction opposite to the freewheel direction until the locking elements inside the freewheel get into the load transfer position. Next, the revolution rate of the freewheel or that of the transmission element interacting with the freewheel (the locking device) drops to zero.

From section L (torque phase) it can be seen that the torque supported by the freewheel increases as the input torque is increasingly supported by the freewheel and the load on the clutch is reduced. The input torque decreases at this stage as the power dissipation produced by the clutch is reduced. At the end of section L and in section M, the system is in first gear. However, the blocking shifting threshold has not yet been undershot, so that in section M the blocking device is still in the release position. Only by further lowering the shifting system pressure in section N does the blocking device, driven by the mechanical resetting means, change to the blocking position, so that at the end of section N, when the shifting system pressure has been completely shut down, a recuperation operation or driving in reverse is also possible.

From the last curve profile shown in FIG. 3 and FIG. 4, it can be seen that the friction clutch and the blocking device are both controlled with the same shifting system pressure in each state of the shifting system.

REFERENCE CHARACTER LIST

1 Axle drive unit
2 Two-speed transmission
3 Transmission drive shaft
4 Outer wheel unit
5 Outer wheel
6 Planetary unit
7',7" Planet wheels
8 Sun unit
9'/9" Supporting sun wheel/output sun wheel
10 Clutch
11 Passive freewheel (locking device)
13 Transmission output shaft
14 Differential unit
15 Differential housing 16 Axle drive housing
17 Planet wheel shaft
18 Differential clutches
19 Blocking device
20 Clutch actuation
22 Blocking actuation
23 Pretensioning means/resetting means
24 Hydraulic pump
25 Hydraulic line harness
EM Electric motor

The invention claimed is:

1. A system, comprising:
   a transmission unit for a motor vehicle with a two-speed transmission, including a plurality of transmission elements to provide two transmission ratios and a shifting system to shift a gear, the shifting system including:
   a friction clutch shiftable by a clutch actuator and (1) holding one of the transmission elements rotationally fixedly in a locking position or (2) blocking some of the plurality of transmission elements rotationally fixedly with respect to each other, wherein, when the friction clutch is in an open position, the friction clutch releases the one of the transmission elements or the some of the plurality of transmission elements so that the one of the transmission elements rotates or the some of the plurality of transmission elements rotate relative to each other;
   a locking device which interacts with one of the transmission elements and which blocks the one of the transmission elements in a locking rotation direction and allows the one of the transmission elements to rotate in a freewheeling rotation direction, wherein the one of the transmission elements interacting with the locking device for one of the two transmission ratios pushes in the locking rotation direction and rotates in the freewheeling rotation direction for the other of the two transmission ratios;
   a blocking device shiftable by a blocking actuator and arranged to block rotation of the one of the transmission elements that interacts with the locking device in the freewheeling rotation direction when in a blocking position and releases the one of the transmission elements for rotation in the freewheeling rotation direction when in a release position;
   wherein the shifting system provides a clutch shifting threshold at which (1) the friction clutch begins to transition from the open position to a closed position or (2) the transition from the closed position to the open position is carried out;
   wherein the shifting system provides a blocking shifting threshold at which the blocking device changes (1) from the blocking position to the release position or (2) from the release position to the blocking position;
   wherein the blocking shifting threshold is coordinated with the clutch shifting threshold such that:
   (1) the blocking device is in the release position before the one of the transmission elements interacting with the locking device begins to turn in the freewheeling rotation direction; or
   (2) the blocking device only changes to the blocking position when the one of the transmission elements interacting with the locking device begins to push in the blocking rotation direction.

2. The system of claim 1, wherein the shifting system provides a fail-safe in one of a first gear or a second gear.

3. The system of claim 1, wherein a control variable is hydraulic pressure and a shifting threshold difference between the blocking shifting threshold and the clutch shifting threshold is at least 0.5 bar.

4. The system of claim 1, wherein both the blocking actuator and the clutch actuator are controlled with a same control variable at the same level independently of an operating state.

5. The system of claim 1, wherein a control variable is hydraulic pressure and the hydraulic control of the blocking actuator and the clutch actuator is carried out by a common line pressure controlled by a single control unit.

6. The system of claim 1, wherein both the clutch actuator and the blocking actuator are mechanical-passive actuation systems.

7. The system of claim 1, wherein the blocking actuator includes a pre-tensioning element dimensioned to mechanically-passively represent the desired blocking shifting threshold in the case of an increasing control variable.

8. The system of claim 1, wherein the clutch actuator includes a pre-tensioning element that is dimensioned to mechanically-passively represent the desired clutch shifting threshold in the case of an increasing control variable.

9. The system of claim 8, wherein the blocking actuator includes a pre-tensioning element dimensioned to mechanically-passively represent the desired blocking shifting threshold in the case of the increasing control variable and the pre-tensioning elements serve as resetting elements which push the blocking device and the friction clutch back into a fail-safe position in the case of a decreasing control variable.

10. The system of claim 1, wherein both the blocking actuator and the clutch actuator are controlled with a same control variable at a same level independently of an operating state.

11. The system of claim 1, wherein the shifting system pressure is controlled by a single control unit.

12. The system of claim 11, wherein the single control unit is one of a single electronically controlled hydraulic pump or a single electronically controlled control valve.

13. The system of claim 1, wherein the input torque introduced into the transmission unit is raised during a gear change from a first gear to a second gear, while the load on the locking device is increasingly reduced due to increasing torque transfer by the clutch.

14. The system of claim 13, wherein, during a gear change from the second gear to the first gear, an electric motor revolution rate is raised to a revolution rate specified by a transmission ratio of the first gear before the locking device begins to support torque in the blocking direction.

15. The system of claim 1, further comprising an axle drive unit for a powertrain of a motor vehicle including the transmission unit.

16. The system of claim 15, wherein the axle drive unit has a differential unit for driving wheel shafts and the two-speed transmission and the differential unit are arranged in a common axle drive housing.

* * * * *